No. 700,686. Patented May 20, 1902.
D. H. HAYWOOD.
VEHICLE WHEEL.
(Application filed Mar. 1, 1902.)
(No Model.) 2 Sheets—Sheet 2.
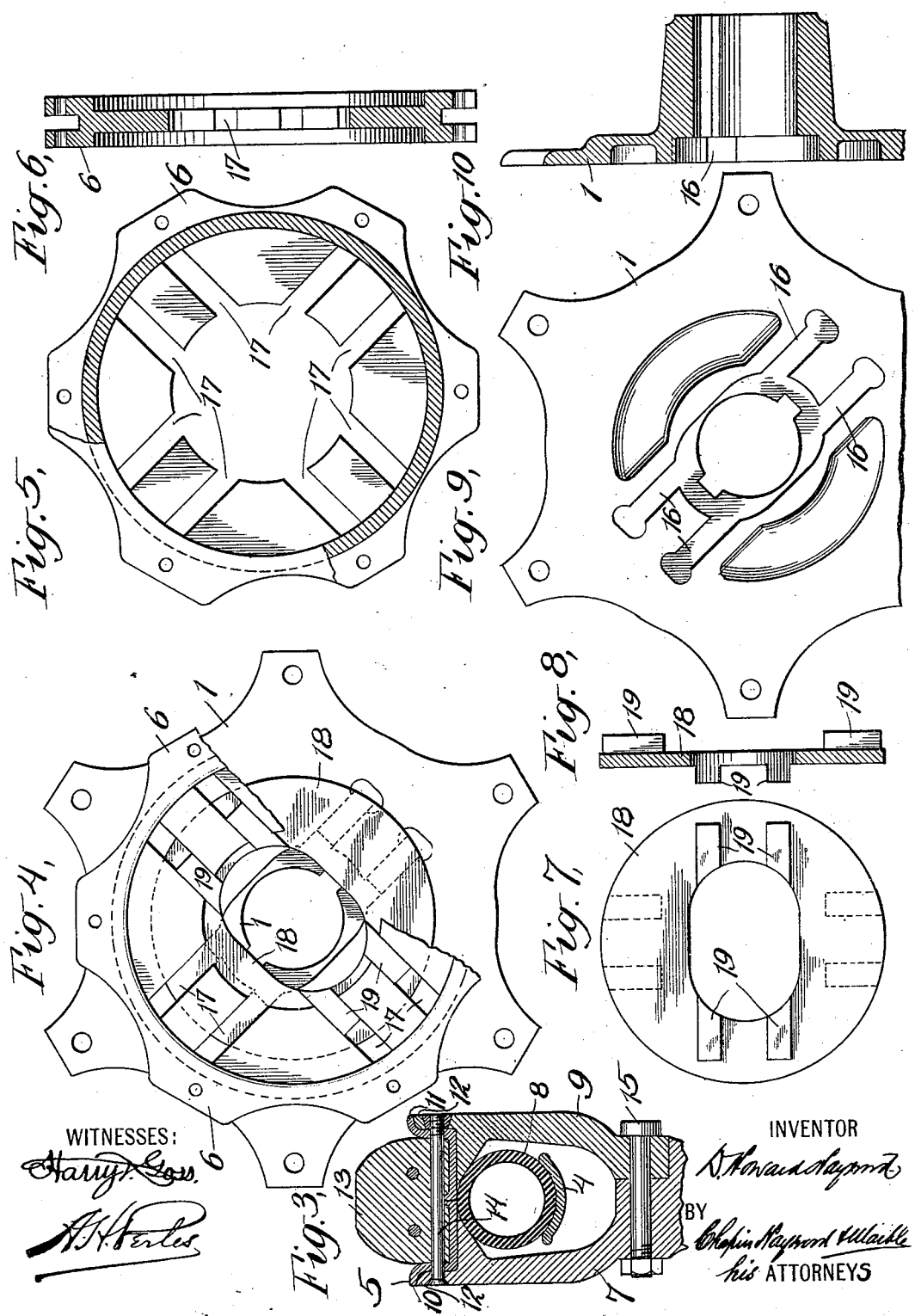
WITNESSES:
INVENTOR
BY
his ATTORNEYS

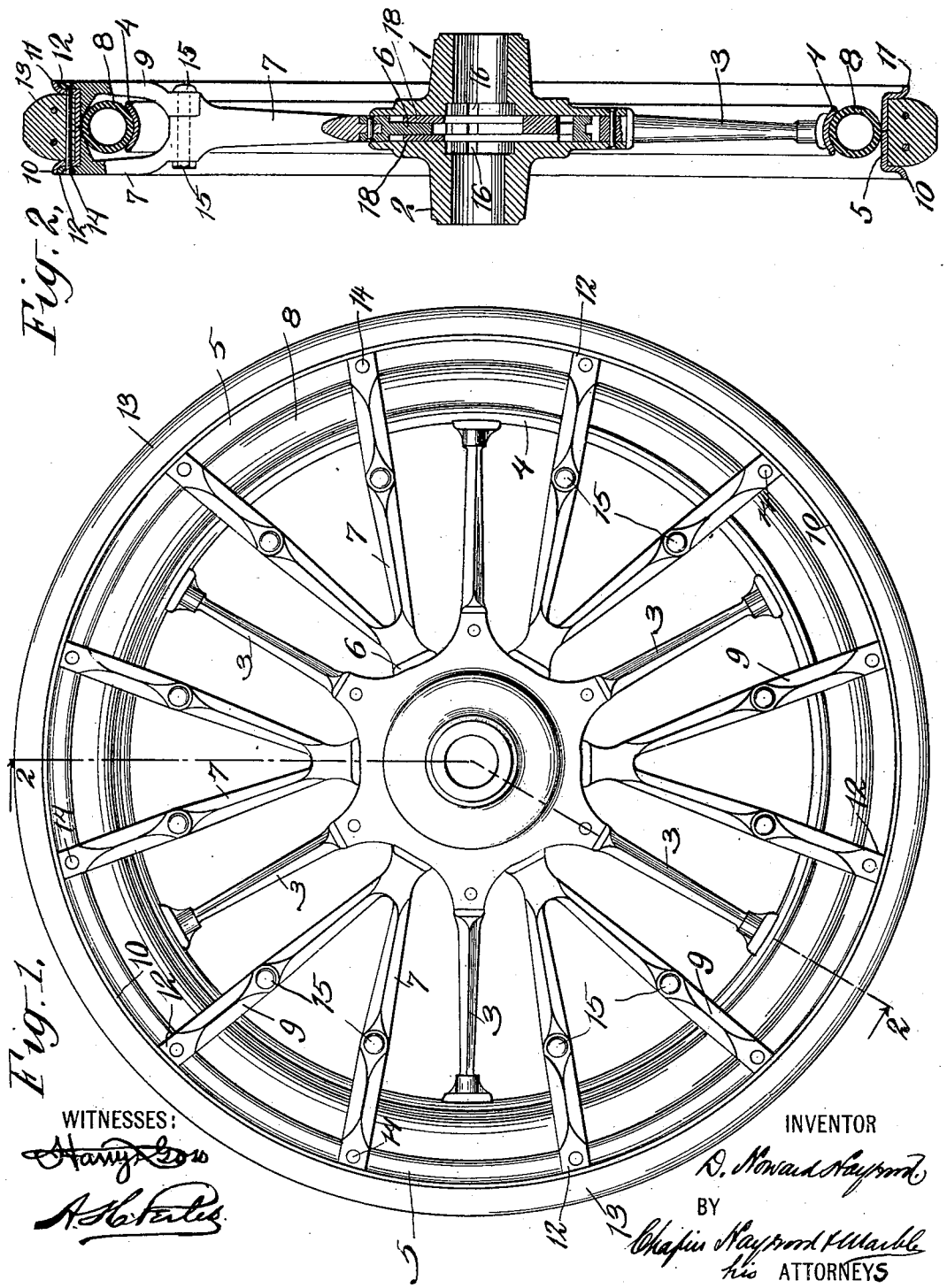

UNITED STATES PATENT OFFICE.

DANIEL HOWARD HAYWOOD, OF NEW YORK, N. Y., ASSIGNOR TO THE WHEEL WITHIN WHEEL COMPANY, OF NEW YORK, N. Y., A CORPORATION OF NEW JERSEY.

VEHICLE-WHEEL.

SPECIFICATION forming part of Letters Patent No. 700,686, dated May 20, 1902.

Application filed March 1, 1902. Serial No. 96,205. (No model.)

*To all whom it may concern:*

Be it known that I, DANIEL HOWARD HAYWOOD, a citizen of the United States of America, residing at New York city, county and State of New York, have invented certain new and useful Improvements in Vehicle-Wheels, of which the following is a specification, reference being had to the accompanying drawings, forming a part thereof.
My invention relates to vehicle-wheels, and particularly to vehicle-wheels of the type described and claimed in United States Letters Patent No. 672,908, of April 30, 1901, and my invention comprises certain improvements in construction and combination of parts, as will be hereinafter set forth.

The main objects of my invention are to simplify and improve the construction and arrangement of parts in the type of wheel set forth in such patent, to strengthen the wheel so that it may be applicable to a very heavy class of work and yet keep the parts as light as possible, and to reinforce and protect such portions of the wheel as are subjected to unusual strain in operation.

I will now proceed to describe a vehicle-wheel embodying my invention and will then point out the novel feature in claims.

In the drawings, Figure 1 is a face view of a vehicle-wheel embodying my invention. Fig. 2 is a view in central transverse section of the same, the plane of section being taken upon the line 2 2 of Fig. 1. Fig. 3 is an enlarged sectional view in detail through the channel tire-rim, cushioning device, hub-rim, and certain portions of the tire-member spokes. Fig. 4 is a detail view, in an enlarged scale and having certain parts broken away, of one of the hub-sections, the central floating plate, and one of the intermediate guide-plates. Fig. 5 is a detail view of the floating plate detached. Fig. 6 is a view in central transverse section thereof. Fig. 7 is a face view of one of the intermediate guide-plates detached. Fig. 8 is a view in central transverse section thereof. Fig. 9 is a view, in detail and partly broken away, of one of the hub-sections employed. Fig. 10 is a view in central transverse section thereof.
This improved wheel comprises two members, one including the hub and the other including the tire. For the purposes of this specification I adopt the terminology employed in said Letters Patent No. 672,908, and I designate that portion carrying the hub as a "hub member" and that portion carrying the outer tire or tread the "tire member."

The hub member comprises the hub proper, formed in two sections 1 2, a plurality of spokes 3, secured to the said hub-sections and radiating therefrom, and a rim 4.

The tire member comprises a channel tire-rim 5, a floating plate 6, and a plurality of spokes 7, connecting the said floating plate and the said channel-tire rim together.

An annular cushioning device, here shown as a flexible inflatable tube 8, is disposed between the inner face of the channel tire-rim 5 and the outer periphery of the hub-rim 4.

The floating plate 6 has a number of radially-extending projections, to which are secured the inner ends of the spokes 7. The spokes 7 are preferably bifurcated and have each two branches which diverge from the inner supported end, and at their outer ends both of the said branches are secured to the channel tire-rim 5. The said spokes comprise two members secured together, the said members arranged upon opposite sides of and to surround the annular cushioning-ring 8. By reference more particularly to Fig. 2 it will be seen that preferably one member only of each of the said spokes is secured to the floating plate, while the other member is secured to the first said member by bolts. The removable member comprises, preferably, a separate portion 9 for each divergent branch of the said spokes. At their outer ends the said spokes 7 and their removable portions 9 are fitted to and engage the inner face of the channel tire-rim 5. The said channel tire-rim 5 has outwardly-flaring flanges 10 11, and the said spokes have portions 12, which engage the said outwardly-flaring flanges and tend to support and protect same.

The channel tire-rim is adapted to support a suitable tire or tread 13 and is preferably formed in two halves or otherwise constructed so as to have a removable flange in order to facilitate the setting of the tire 13 in place and its removal for repairs or otherwise when desired. Bolts 14 pass through the outer portions of the said spokes, through the flanges of the channel tire-rim, and through the tire or tread 13. The heads of the said bolts are preferably countersunk into the said spokes, so that the said heads shall be flush therewith, and the nuts engaging the said bolts are also preferably recessed into the said spokes for the same reason.

The outside faces of the spokes 7 at or near their outer ends are arranged substantially flush with the outside edges of the outwardly-flaring flanges 10 11 of the channel tire-rim 5 and in this way tend to protect and stiffen the channel tire-rim, so that it will be less liable to damage, as by running against the curb of a sidewalk, than if such stiffening means were not provided. The head of the bolts 14 and the nuts thereof being countersunk into the said spokes there will be no danger of the said heads or nuts being torn off from the same cause. Other bolts 15 are provided for further securing the spoke members together.

The hub-sections 1 2 are provided upon their inner faces with a plurality of parallel grooves 16. The said grooves in one hub-section are arranged at right angles to similar grooves in the opposite section. The floating plate 6 is provided with a plurality of parallel grooves 17, said grooves being arranged in two sets, one set at right angles to the other. Intermediate guide-plates 18 are provided, the said guide-plates each comprising an annular disk having two sets of parallel projecting tongues 19 thereon, the said sets arranged at right angles to each other upon opposite sides of the said disk. The guide-plates are arranged between the central floating plate 6 and the adjacent hub-sections 1 2, with their tongues 19 engaging the grooves or slots 16 17. By reason of the arrangement of grooves or slots 16 in the hub-sections the intermediate guide-plates will necessarily be arranged with the tongues of one guide-plate at right angles to the corresponding tongues of the other guide-plate. By reason of this construction and arrangement I am enabled to employ a very much thinner plate of metal for the floating plate than would be necessary if the corresponding grooves in the opposite hub-sections were opposite to each other, and hence the corresponding tongues of the intermediate guide-plates also opposite to each other. This is desirable as tending to decrease the weight of the wheel, while not sacrificing any strength.

The arrangement is further advantageous as more evenly distributing the driving strain, which necessarily passes through the floating plate and intermediate guide-plate connection. It will be noted that I have further distributed the strain by providing a plurality of parallel slots, and hence a greater number of tongues upon the intermediate guide-plates than in this type of wheel as constructed formerly.

What I claim is—

1. In a wheel, the combination with a hub, spokes and a rim, of a channel tire-rim having outwardly-flaring flanges, a tire supported by said channel tire-rim, an annular cushioning device between the tire-rim and the first said rim, a floating plate, spokes arranged on either side of the said annular cushioning device, and connecting the said floating plate and the tire-rim together, said spokes having portions which engage the sides of the outwardly-flaring flanges of the tire-rim; and an intermediate guide-plate between the floating plate and the hub.

2. In a wheel, the combination with a hub, spokes and a rim, of a channel tire-rim having outwardly-flaring flanges, a tire supported by said channel tire-rim, an annular cushioning device between the tire-rim and the first said rim, a floating plate, spokes arranged on either side of the said annular cushioning device, and connecting the said floating plate and the tire-rim together, said spokes having portions which engage the sides of the outwardly-flaring flanges of the tire-rim, the outside of which portions are substantially flush with the extreme outside edges of the said outwardly-flaring flanges; and an intermediate guide-plate between the floating plate and the hub.

3. In a wheel, the combination with a hub, spokes and a rim, of a channel tire-rim having outwardly-flaring flanges, a tire supported by said channel tire-rim, an annular cushioning device between the tire-rim and the first said rim, a floating plate, spokes arranged on either side of the said annular cushioning device, and connecting the said floating plate and the tire-rim together, said spokes having portions which engage the sides of the outwardly-flaring flanges of the tire-rim, bolts passing through the said spoke portions, the channel tire-rim and the tire; and an intermediate guide-plate between the floating plate and the hub.

4. In a wheel, the combination with a hub, spokes and a rim, of a channel tire-rim having outwardly-flaring flanges, a tire supported by said channel tire-rim, an annular cushioning device between the tire-rim and the first said rim, a floating plate, spokes arranged on either side of the said annular cushioning device and connecting the said floating plate and the tire-rim together, said spokes having portions which engage the sides of the outwardly-flaring flanges of the tire-rim, the outside of which portions are substantially flush with the extreme outside edges of the said outwardly-flaring flanges, bolts passing through the said spoke portions, the channel tire-rim and the tire; and an intermediate guide-plate between the floating plate and the hub.

5. In a wheel, the combination with a hub, spokes and a rim, of a channel tire-rim having outwardly-flaring flanges, and adapted to support a tire, an annular cushioning device between the tire-rim and the first said rim, a floating plate, spokes comprising each two members secured together and arranged upon opposite sides of the said annular cushioning device, said spokes secured at their inner ends to the floating plate and at their outer ends engaging the inner face of the channel tire-rim and also engaging the sides of the outwardly-flaring flanges thereof; and an intermediate guide-plate between the floating plate and the hub.

6. In a wheel, the combination with a hub, spokes and a rim, of a channel tire-rim having outwardly-flaring flanges, and adapted to support a tire, an annular cushioning device between the tire-rim and the first said rim, a floating plate, spokes comprising each two members secured together and arranged upon opposite sides of the said annular cushioning device, said spokes secured at their inner ends to the floating plate and at their outer ends engaging the inner face of the channel tire-rim and also engaging the sides of the outwardly-flaring flanges thereof, bolts passing through the said spoke members, the channel tire-rim and the tire; and an intermediate guide-plate between the floating plate and the hub.

7. In a wheel, the combination with a hub, spokes and a rim, of a channel tire-rim adapted to support a tire, said channel tire-rim having outwardly-flaring separable flanges, an annular cushioning device between the tire-rim and the first said rim, a floating plate, spokes comprising each two members secured together and arranged upon opposite sides of the said annular cushioning device, said spokes secured at their inner ends to the floating plate and at their outer ends engaging the inner face of the channel tire-rim and also engaging the sides of the outwardly-flaring flanges thereof; and an intermediate guide-plate between the floating plate and the hub.

8. In a wheel, the combination with a hub, spokes and a rim, of a channel tire-rim adapted to support a tire, said channel tire-rim having outwardly-flaring separable flanges, an annular cushioning device between the tire-rim and the first said rim, a floating plate, spokes comprising each two members, secured together and arranged upon opposite sides of the said annular cushioning device, said spokes secured at their inner ends to the floating plate and at their outer ends engaging the inner face of the channel tire-rim and also engaging the sides of the outwardly-flaring flanges thereof, bolts passing through the said spoke members, the channel tire-rim and the tire; and an intermediate guide-plate between the floating plate and the hub.

9. In a wheel, the combination with a hub, spokes and a rim, of a channel tire-rim adapted to support a tire, said channel tire-rim having outwardly-flaring separable flanges, an annular cushioning device between the tire-rim and the first said rim, a floating plate, spokes comprising each two members secured together and arranged upon opposite sides of the said annular cushioning device, said spokes secured at their inner ends to the floating plate and at their outer ends engaging the inner face of the channel tire-rim and also engaging the sides of the outwardly-flaring flanges thereof, the outside faces of said spokes being substantially flush with the extreme outside edges of the said outwardly-flaring flanges, flush bolts passing through the said spoke members, the channel tire-rim and the tire, flush nuts, for said bolts, recessed into said spokes; and an intermediate guide-plate between the floating plate and the hub.

10. A wheel comprising two relatively movable members, one a tire member and the other a hub member, and having a cushioning device between them, the hub member comprising two hub-sections, spokes and a rim, the said hub-sections having grooves therein, the grooves in one section being at right angles to the grooves in the opposite section, the said tire member including a floating plate having grooves at right angles therein; together with two intermediate guide-plates each comprising an annular disk having projecting tongues thereon, arranged at right angles to each other upon opposite sides thereof, the said guide-plates disposed between the floating plate and the hub-sections, with the tongues thereof engaging the grooves in the said floating plate and hub-sections.

11. A wheel comprising two relatively movable members, one a tire member and the other a hub member, and having a cushioning device between them, the hub member comprising two hub-sections, spokes and a rim, the said hub-sections having a plurality of parallel grooves therein, the grooves in one section being at right angles to the grooves in the opposite section, the said tire member including a floating plate having a plurality of parallel grooves at right angles therein; together with two intermediate guide-plates, each comprising an annular disk having two sets of parallel projecting tongues thereon, the sets arranged at right angles to each other upon opposite sides thereof, the said guide-plates disposed between the floating plate and the hub-sections, with the tongues thereof engaging the grooves in the said floating plate and hub-sections.

DANIEL HOWARD HAYWOOD.

Witnesses:
C. F. CARRINGTON,
A. H. PERLES.